United States Patent [19]

Jokinen et al.

[11] Patent Number: 5,267,308
[45] Date of Patent: Nov. 30, 1993

[54] SPEED DIALLING METHOD FOR A TELEPHONE UNIT

[75] Inventors: Tauno Jokinen; Ahti Väisänen, both of Oulu, Finland

[73] Assignee: Nokia Mobile Phones Ltd., Salo, Finland

[21] Appl. No.: 763,633

[22] Filed: Sep. 23, 1991

[30] Foreign Application Priority Data

Sep. 27, 1990 [FI] Finland ................................. 904776

[51] Int. Cl.$^5$ ...................... H04M 11/00; H04M 1/00
[52] U.S. Cl. ........................................ 379/354; 379/58; 379/59; 379/355; 379/356
[58] Field of Search ................... 379/58, 59, 354, 355, 379/356

[56] References Cited

U.S. PATENT DOCUMENTS

| | | | |
|---|---|---|---|
| 4,508,939 | 4/1985 | Lawson et al. | 379/355 |
| 4,908,853 | 3/1990 | Matsumoto | 379/355 |
| 5,097,502 | 3/1992 | Suzuki et al. | 379/356 |
| 5,119,417 | 6/1992 | Suzuki et al. | 379/355 |
| 5,131,029 | 7/1992 | Kunstadt | 379/355 |
| 5,136,637 | 8/1992 | Rust et al. | 379/355 |

*Primary Examiner*—Curtis Kuntz
*Assistant Examiner*—Vijay Shankar
*Attorney, Agent, or Firm*—Darby & Darby

[57] ABSTRACT

In a speed dialing method for a telephone unit, a dialed telephone number is automatically stored in a speed dialing memory. The memory is automatically sorted at each call, the telephone numbers always being in an order determined by their dialing frequency, with the most frequently dialed number at the top. By pressing step/skip buttons, the caller can scan such an adaptable memory. The method is applied in mobile telephones, in particular car radiophones.

9 Claims, 2 Drawing Sheets n = pointer value to indicate desired memory location
name(n) = text string stored in memory location n
number(n) = telephone number (or eq.) stored in memory location n
NOC(n) = number of calls called to number(n)
noname, max, limit = parameters

SPEED DIALLING METHOD FOR A TELEPHONE UNIT

BACKGROUND OF THE INVENTION

The invention relates to a speed dialing method for a telephone unit provided with a display unit and a program-controlled processor unit. A telephone unit is here taken as meaning all telephone applications, and in particular mobile telephones and car radiophones.

Speed dialing to facilitate the use of telephones has been known for a long time, especially where the caller has to dial long or/and frequently repeated telephone numbers. For instance, in usual home telephones the repetition of the number last dialed is implemented by actuating a particular function button or key.

On the other hand, the storage of speed dialing numbers in a storage register or memory is also known, an identification code being then added to the memory location of the telephone number. The speed dialing number desired by the caller (user) is selected by means of the identification code. In certain cases, such speed dialing is called short code dialing. This dialing is usually assisted by a particular short code dialing register, e.g. in printed form. Recently, such a print out has been replaced by a telephone display, which enables one to use an alphanumerical character series in addition to the identification code or instead of it. The character series facilitates the identification and dialing of the desired telephone number. Moreover, for instance in mobile telephones, particular service buttons or keys of a keyboard are used for scanning the speed dialing register, whereby the register can be checked on the display, one telephone number at a time. This is an advantage for the caller for instance when he is driving a car, since no special attention has to be paid to the number or character buttons or keys. The scanning also replaces exact memorizing of the selected speed dialing codes. In other words, it acts as a "telephone diary" for the speed dialing operation. However, the scanning may become onerous if the register is large, and furthermore, the programming of the speed dialing operations may be difficult for the caller. The invention aims at a simplification of speed dialing operations and at an enhanced service reliability.

SUMMARY OF THE INVENTION

In the method according to the invention, the speed dialing register for the telephone unit is "adaptable", i.e. the method takes account of the caller's varying dialing needs by placing the most frequently dialed numbers at "the top of the register", where they are readily available. The invention also eliminates the need for programming the register, since the register is produced automatically.

The invention is preferably applied to mobile telephones and particularly to telephones used in cars, where the method simplifies the use of the telephone and thus increases driving safety.

BRIEF DESCRIPTION OF THE DRAWINGS

The invention is described in further detail below using one exemplary embodiment as well as the enclosed drawings, in which.

DESCRIPTION OF THE PREFERRED EMBODIMENT

In the example, it is assumed that a display and function buttons, as well as a microprocessor with a memory to control telephone unit operation by means of programs, are provided in the mobile telephone (for instance the NOKIA Talkman 620). The display may be of any known type, for instance an illuminated liquid crystal display, in which alphanumerical and graphical signals relating to the use of the telephone are displayed. The function keyboard comprises, besides ordinary numeric buttons, function buttons for controlling the telephone operation in a manner known per se.

Figure 1:
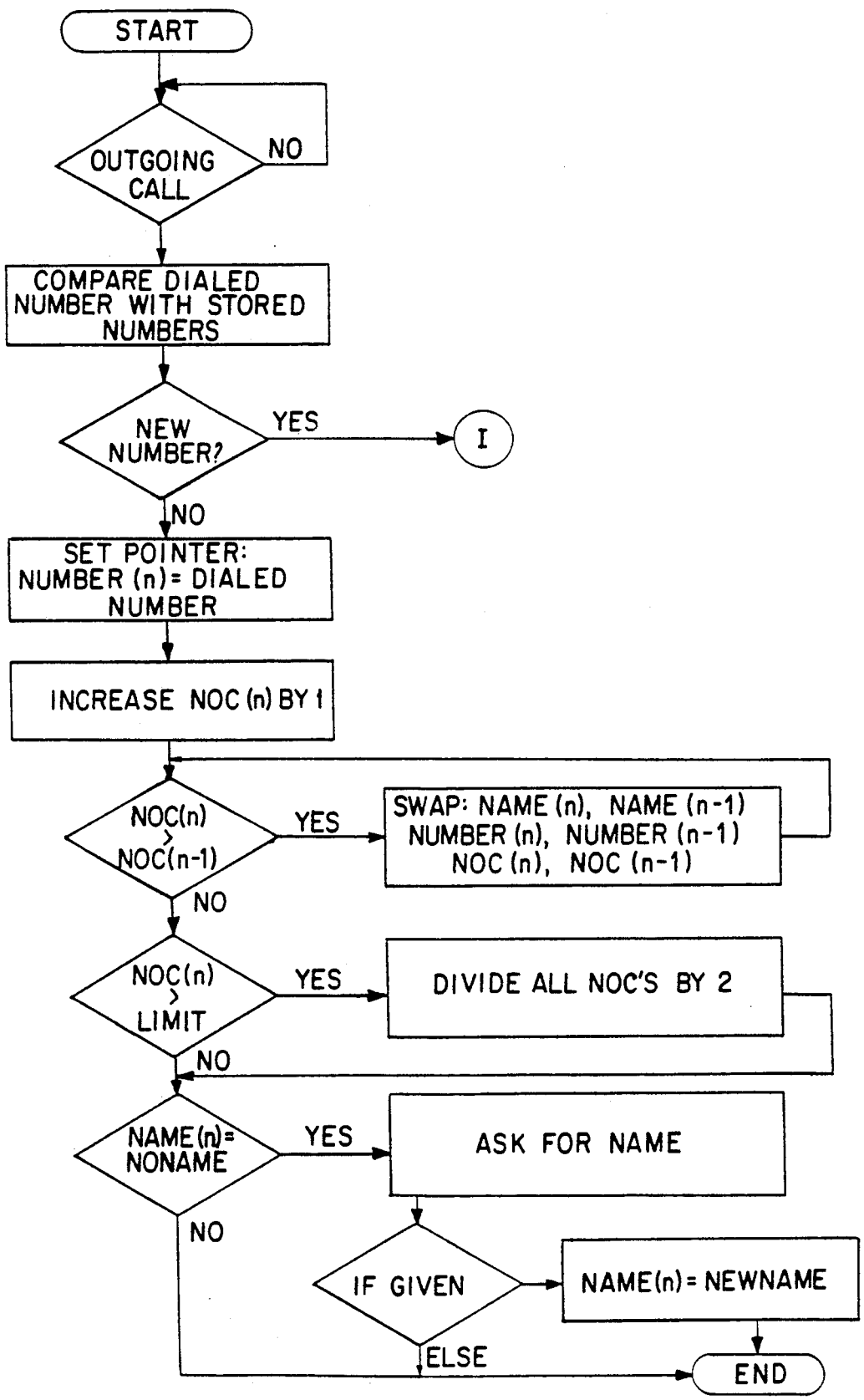
FIGS. 1 and 2 show the flow chart of a program controlling the speed dialing operation.

Thus, in accordance with the method of the invention, a program segment, controlling the speed dialing operation, is added to the software of the microprocessor of the telephone (FIGS. 1+2). As the caller dials a telephone number, it is read into the memory (step a) by the microprocessor for a normal call control operation, known per se. The speed dialing memory is formed, according to the invention, by storing the telephone number in a second step (step b) in a free storage location of the speed dialing register, if the dialed number does not already exist in the register. The numerical value 1 is added to the content of an accumulator connected to the storage location of the selected number each time this number is dialed. Subsequently, in a third step (c), the microprocessor reads the contents of the accumulators and puts the telephone numbers in descending order according to the content of the accumulators, except that the new number, i.e. the last dialed is placed higher in the register than the other numbers that have been previously called only once. The programming of this procedure can be carried out in many different ways, known per se to a person skilled in the art, so that the program is presented here only in the form of a flow chart.

When the mobile telephone has been placed in use, a register of speed dialing numbers is formed automatically as described above. The length of the register increases as the caller dials new telephone numbers. A battery-secured memory is provided in the telephone, so the numbers are preserved in this memory even during an interruption in the supply voltage of the telephone, for instance during replacement or discharge of the batteries. In the determination of the size of a speed dialing memory, the longest possible number series, up to an 18 digit-series, including country and international codes, has been taken into account.

Figure 2:
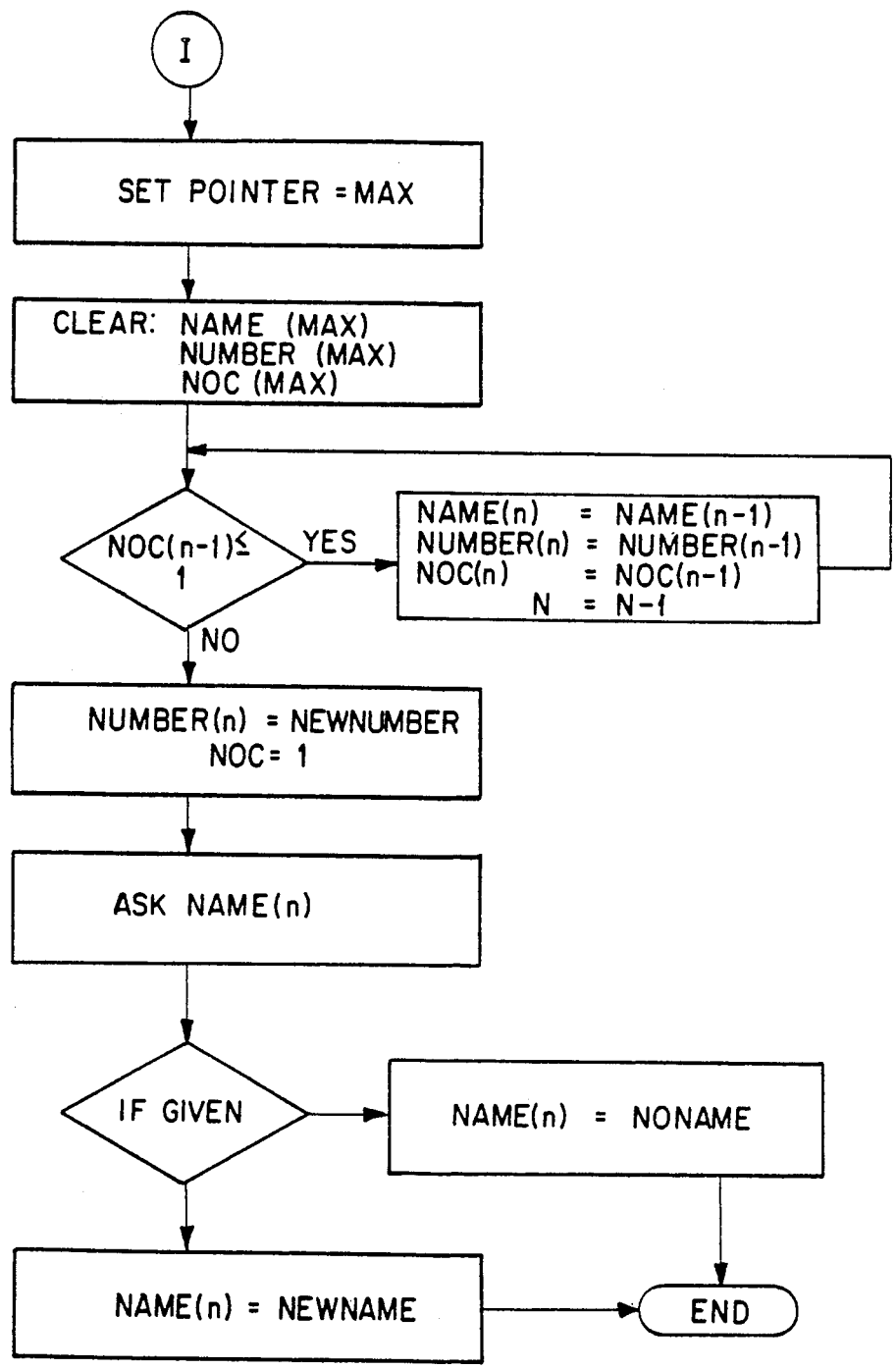

The memory available for the telephone sets a limit on the length of the register, and on the other hand, the usability of the register does not increase beyond a certain limit. This storage location limit could be a number below 100, e.g. 98 locations. When the register is full, the newest telephone number is always placed higher than the ones that have been called only once. The lowest number in the register "overflows" and is erased from the memory. The number of registered calls placed to a specific telephone number is also limited by the size of the accumulators. In this case, the program checks the numerical values in the accumulators at each call (in step c), the content of all of the accumulators being divided by a predetermined divisor, in the exemplary embodiment of FIG. 2, if the maximum accumulator content exceeds a pre-set limit value, 50 for instance.

The speed dialing numbers are utilized in the following manner:

As the caller activates the mobile telephone in order to place a call (step d), the number, which was last dialed appears on the display, whereby it can be redialed by a simple pressing of a function button or key. For reasons of secrecy, the caller may erase the dialed number from the memory by pressing a specific combination of buttons at the end of the preceding call, so that this number will no longer appear on the display. In this case, no telephone number is displayed on the display unit. In both cases, the caller may now select the number at the top of the speed dialing memory to be displayed by pressing a function button (NEXT, for instance). A specific amount of numbers, e.g. the five numbers latest dialed, may be stored, whereby the caller may step to the second last number etc., by pressing a button.

The beginning of the dialing step (step d) may be optionally implemented so that, instead of the number last dialed, the one at the top of the speed dialing register, i.e. the "favored number", appears directly on the display. In the next step (dl) the caller may scan the register one number at a time by pressing the function button (NEXT), until the desired speed dialing number appears on the display. In order to speed up the scanning, the caller may skip for instance 15 numbers in the register (in step dl) by selecting 15 with the digital buttons and pressing subsequently a particular function button (RCL). The caller may repeat the operations of step dl as many times as he wishes and vary the scanning manner as needed, until the desired speed dialing number appears on the display.

When the caller has obtained the desired telephone number on the display, he may activate the dialing (in step e), i.e. cause the telephone unit to transmit the displayed telephone number as a dialing signal to the telephone connection. In all the steps mentioned above (steps, d, dl and d), the caller may of course dial the telephone number himself by using the numeric buttons, whether this desired number exists in the speed dialing memory or not. After dialing, the telephone unit stores the number last dialed and/or adds to the numerical value of the associated accumulator, and also puts the speed dialing number table in the order indicated by the accumulators (steps b and c).

The inventive method described above may naturally be varied in many ways. For instance, step c) may include statistical processing, by means of which the use of the telephone and the calling frequency of the dialed numbers may be observed. Moreover, the desired numbers may be locked in the speed dialing table, thus enabling the numbers considered important to remain at the top of the speed dialing table, even if some other number is temporarily dialed more often. The telephone numbers may of course be arranged in some other manner, e.g. in descending order, the operation of the register being then arranged to match this.

It can also be assumed that the caller selects the desired function for step d) by means of the setting of the mobile telephone, i.e. whether the number last dialed, or the speed dialing number at the top, should be first displayed on the display unit. In step dl), it is possible to implement either forward or backward scanning by using for instance arrow buttons or keys of the telephone unit (+and−). A person skilled in the art also realizes that skipping by means of the RCL button could be replaced by scanning the speed dialing memory by pressing the NEXT button, starting slowly one number at a time, and going on more rapidly, by continuously pressing down the button. Optionally, a predetermined number of steps can be skipped in the memory by a rapid double pressing of the NEXT button.

Finally it is conceivable that the adaptable speed dialing memory according to the invention is completed with codes, either numbers or alphanumerical character strings, inserted in the register by the caller. In this case the size of the speed dialing table has to be made large enough to allow the addition of e.g. a 4-8-digit code for each number, in addition to the telephone numbers and accumulators. Thus, as the display is being scanned, it would show the telephone number together with a code, which enables a rapid identification and dialing of the desired telephone number.

The method according to the invention makes the use of speed dialing easier, since in terms of the basic concept, the caller does not need to participate in the programming of the speed dialing register; he only has to know how to use it. Furthermore, the speed dialing numbers are automatically arranged in a logical order by adaptation, this order being likely to match the dialing habits of the caller.

The method according to the invention has been described above in connection with a mobile telephone. However, its application is naturally not limited to a mobile telephone, but the method can be applied to all telephone units equipped with the essential elements in view of their function and operation, as mentioned above.

We claim:

1. A speed dialing method for a telephone unit having a keypad with numeric keys and function keys, a display unit and a program-controlled processor unit with a storage element for the control of the operation of the telephone unit, said method comprising the steps of:
   a) causing the telephone number dialed each time by the caller to be read by the processor unit of the telephone unit;
   b) storing said telephone number the first time it is dialed in a free memory location of a speed dialing memory section of said storage element and, if said dialed number is already stored in a memory location, accumulating a predetermined numerical value in a respective accumulator associated with the memory location of the dialed telephone number;
   c) putting the telephone numbers in the speed dialing memory into an order corresponding to the content of their respective accumulators;
   d) as a new call is being initiated, displaying the first telephone number in the speed dialing memory or the respective number last dialed during the previous call on the display unit, providing the caller with the option of displaying the first telephone number in said speed dialing memory by pressing a particular function key; and
   e) by means of a a further function key actuated by the caller, directing the telephone unit to transmit the telephone number showing on the display unit as a dialing signal to a telephone connection.

2. A method according to claim 1, wherein a specific amount of numbers are stored in the memory, and, as the number last dialed is displayed, the caller may step to a respective preceding number by pressing a still further function key.

3. A method according to claim 1 or 2, wherein in step c), a new telephone number last dialed is placed in the speed dialing memory on top of numbers that have been called only once.

4. A method according to claim 1, wherein in step c), the highest individual accumulator content is detected and the contents of all of the accumulators are divided by a predetermined divisor, if the highest individual accumulator content exceeds a pre-set limit value.

5. A method according to claim 4, wherein in step b), said predetermined numerical value is 1, and the pre-set limit value in step c), is 50, and said divisor is 2.

6. A method according to claim 1, wherein step c) includes a further step, in which the caller, by pressing a still further function key, may select the next number in the speed dialing memory to be displayed, and may repeat said further step a desired number of times.

7. A method according to claim 6, wherein in said further step, the caller may optionally sip a selected number of stored numbers in the speed dialing memory by pressing a specific function key.

8. The method of claim 1, wherein the steps are performed in using a mobile telephone, in particular a car radiophone.

9. A method according to claim 1, wherein the quantity of memory locations in said memory is limited, further comprising the step of purging a once-dialed number previously stored in said memory and storing in the memory location the latest dialed number, which is not already in said memory.

* * * * *